United States Patent
Peters, Sr. et al.

(10) Patent No.: US 10,569,964 B1
(45) Date of Patent: Feb. 25, 2020

(54) PRODUCT DETECT DISCHARGE SAFETY SWITCH

(71) Applicant: Amazon Technologies, Inc., Seattle, WA (US)

(72) Inventors: Joseph M. Peters, Sr., Shelbyville, TN (US); Randy A. Davis, Hermitage, TN (US); Richard Neal Jones, Jr., Murfreesboro, TN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/868,687

(22) Filed: Jan. 11, 2018

(51) Int. Cl.
| | |
|---|---|
| *B65G 43/02* | (2006.01) |
| *B65G 17/40* | (2006.01) |
| *B65G 17/32* | (2006.01) |
| *B65G 17/24* | (2006.01) |
| *B65G 43/08* | (2006.01) |

(52) U.S. Cl.
CPC ............ *B65G 43/02* (2013.01); *B65G 17/24* (2013.01); *B65G 17/32* (2013.01); *B65G 17/40* (2013.01); *B65G 43/08* (2013.01); *B65G 2201/02* (2013.01); *B65G 2203/0233* (2013.01); *B65G 2203/047* (2013.01); *B65G 2205/04* (2013.01); *B65G 2207/40* (2013.01); *B65G 2812/02108* (2013.01)

(58) Field of Classification Search
CPC ........ B65G 43/02; B65G 17/24; B65G 17/32; B65G 17/40; B65G 43/08
See application file for complete search history.

(56) References Cited

U.S. PATENT DOCUMENTS

| 7,360,641 B1 | 4/2008 | Fourney | |
| 9,533,831 B2 * | 1/2017 | Nelson | B65G 43/02 |

* cited by examiner

*Primary Examiner* — Gene O Crawford
*Assistant Examiner* — Lester Ill Rushin
(74) *Attorney, Agent, or Firm* — Patterson + Sherida, LLP

(57) ABSTRACT

Methods and apparatus for shutting down a conveyor when an article moves past a discharge point are provided. A shutdown device includes a contact member disposed in a spaced relationship with a discharge end of a conveyor comprising a conveyor belt, wherein the contact member extends substantially across a width of the conveyor belt, wherein the contact member is positionable between a first position and a second position, a force regulator coupled to the contact member configured to set a minimum threshold force for moving the contact member from the first position to the second position, and a switch operably connected to the contact member, wherein the contact member causes the switch to toggle the conveyor between an operating mode when the contact member is in the first position and a shutdown mode when the contact member is in the second position.

20 Claims, 11 Drawing Sheets

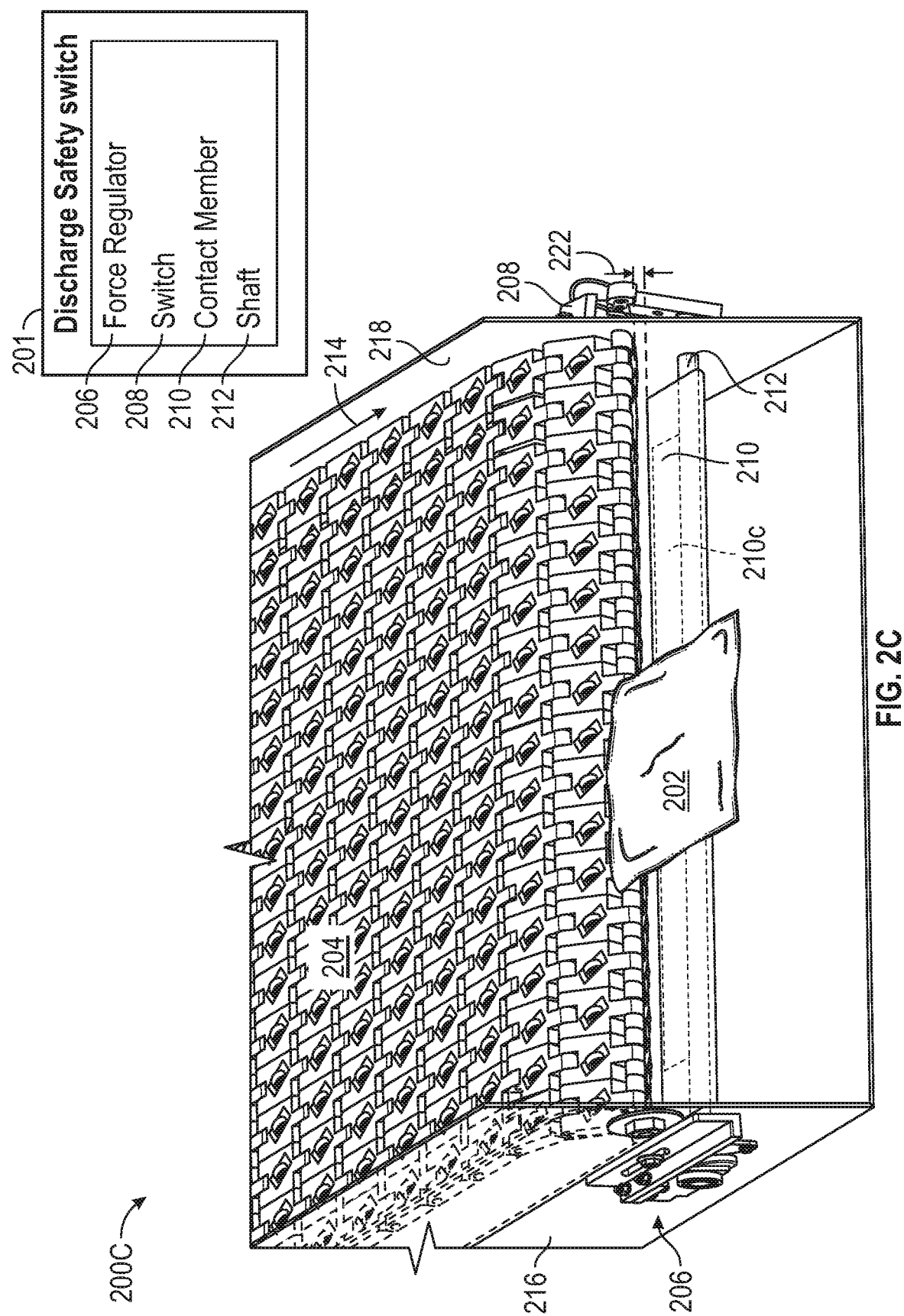

PRODUCT DETECT DISCHARGE SAFETY SWITCH

BACKGROUND

The present invention relates to a shutdown device, and more specifically, to a discharge safety switch configured to shut down a conveyor.

A conveyor system may be used to move articles from one location to another. For example, warehouses, manufacturing facilities, distribution centers, and fulfillment centers use conveyor systems to move and sort articles. Articles may be routed along a system of conveyor belts to reach a desired location.

Certain conveyor belts include rollers on the surface of the conveyor belt, which contact articles disposed on the belt. The rollers are controlled, for example using an air supply underneath the conveyor belt, to turn, spin, or direct articles on the conveyor belt. Often times, articles may be routed to a specific location in a facility by traveling on a series of conveyor belts. Due to the high volume of articles handled by conveyor systems and the cost associated with downtime and repairs, it is important that conveyor systems operate efficiently without creating hazards that force the conveyor system to shut down.

BRIEF DESCRIPTION OF DRAWINGS

FIG. 2C illustrates a discharge safety switch oriented in a second position as a result of a force applied by an article from the conveyor belt on the contact member of the discharge safety switch causing the contact member to move from the first position to the second position, according to one embodiment described herein.

DETAILED DESCRIPTION

Sortation systems including a plurality of conveyors are used in facilities to efficiently move articles between various processing stations. Conveyor systems transport packaged or unpackaged articles. The articles may be packed using flexible packaging such as plastic bags, polyethylene (polypack) envelopes, or bubble packs.

During normal operation, articles may need to traverse various "pinch points" of a sortation system, as well as be removed from the sortation system at a discharge point of a conveyor. As described herein, a pinch point refers to a space between a moving part and either another moving part or a stationary part. Articles may travel over pinch points as they are routed from a first conveyor belt to a second conveyor belt. A discharge point refers to a location at which articles are to be removed from the conveyor.

According to embodiments described herein, an article or the packaging enclosing the article may become stuck to a first conveyor belt which then presents a potential hazard at pinch points and discharge points. For example, instead of the article being diverted off of the first conveyor belt at a pinch point (for example, between the first conveyor belt and a second conveyor belt), the article may remain on the first conveyor belt. In another example, the article may remain caught on the first conveyor belt as the article moves past a discharge end of the conveyor.

Current methods that attempt to control flow and avoid jamming on a conveyor belt are insufficient to prevent an article that may be caught on the conveyor belt from traveling along the return side of the belt, under the conveyor. As an example, a beam of a laser photoelectric sensor (photo-eye) needs to be disrupted for a predetermined amount of time before a conveyor shuts down. In an effort to distinguish between articles properly moving on the conveyor belt along the desired direction of conveyor belt travel and articles which may improperly traverse the return side of the conveyor belt, the photo-eye would need to be placed along the return of the conveyor belt, as the belt moves underneath the conveyor. A photo-eye placed along the return of the conveyor below, however, is not able to detect improper article travel until it is already along the return side of the conveyor belt. When the article has reached the return side of the conveyor, the photo-eye may not be able to shut down the conveyor down fast enough to avoid the article actually traveling far enough on the return side of the belt to cause damage to the conveyor, and subsequent downtime and costly repairs. The shutdown device described herein shuts down the conveyor to prevent articles stuck on the conveyor belt from traveling on the return side of the conveyor belt.

Figure 1A:
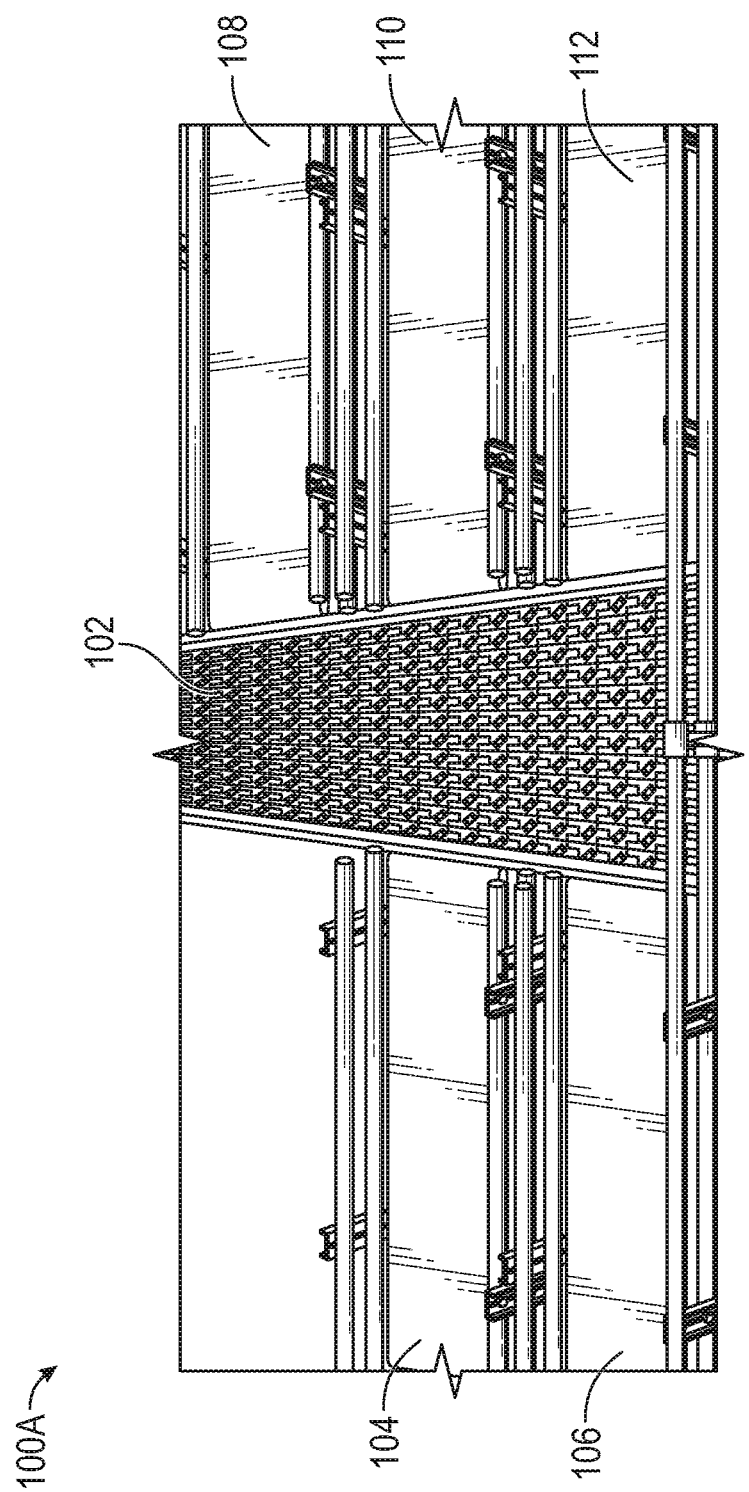
FIG. 1A illustrates an example sortation system in which embodiments described herein can be implemented.

FIG. 1A illustrates a sortation system including multiple conveyors, according to one embodiment described herein. The sortation system 100A may be located in a facility or warehouse (e.g., distribution facility, fulfillment center, etc.). In the illustrated example, one or more the conveyors 102, 104, 106, 108, 110, and 112 include a plurality of rollers and a conveyor belt disposed on the plurality of rollers. The interaction between the conveyor belt and the plurality of rollers causes articles moving on the conveyor belt to move along a longitudinal direction of the conveyor belt or at an angle with respect to the longitudinal direction of the conveyor belt. In the example illustrated at 100A, articles on the conveyor belt 102 may move bidirectionally on the conveyor 102 or at a 90 degree angle from conveyor 102 to one of conveyors 104, 106, 108, 110, or 112. A pinch point exists between conveyor 102 and each of conveyors 104, 106, 108, 110, and 112.

Figure 1B:
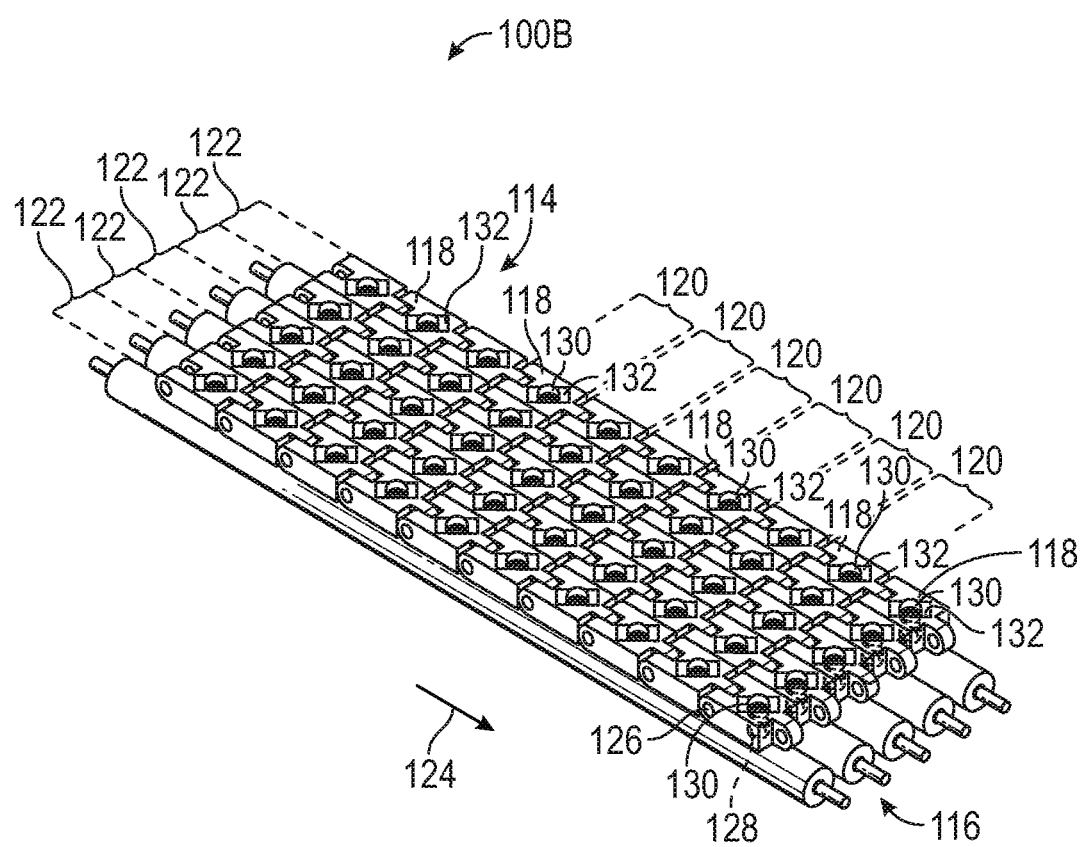
FIG. 1B illustrates an example conveyor belt disposed on a plurality of rollers, according to one embodiment described herein.

FIG. 1B illustrates a conveyor 100B that may be representative of any of the conveyors 102, 104, 106, 108, 110, and 112 shown in FIG. 1. The conveyor 100B includes a conveyor belt 114 disposed on a plurality of rollers 116. A plurality of conveyor belt modules 118 are linked together to form the conveyor belt 114. The conveyor belt modules 118 are aligned in transverse rows 120 that extend across the width of the conveyor belt and in longitudinal columns 122 that extend along a longitudinal direction of the conveyor belt 114, which coincides with the direction of belt travel 124 of the conveyor belt.

By way of example, the conveyor belt modules are pivotally connected to adjacent conveyor belt modules along the longitudinal direction of the conveyor belt 114 with transverse shafts 126. The conveyor belt modules 118 include roller sets that comprise a first (or bottom) roller 128 and second (or top) roller 130 that are arranged in a vertically-stacked orientation within an inner space 132 of the modules. The rollers 116 are in contact with the bottom rollers 128 while the conveyor belt 114 is moving. Thus, the plurality of rollers 116 drives the bottom rollers 128, which in turn drive the top rollers 130 of the conveyor belt modules 118. In this way, articles disposed on the top rollers 130 can be moved in a direction transverse to the direction 124 of the belt. For example, with reference to FIG. 1A, assuming the conveyor 100B is illustrative of conveyor 102, articles disposed on conveyor 102 can be moved onto conveyor 104 by actuating rollers 116 disposed beneath 100B at a location between conveyor 104 and conveyor 110.

Based, at least in part, on the structure of the conveyor belt 114 including conveyor belt modules 118, rollers 128, 130, and inner spaces 132, articles or packaging materials enclosing an article may get caught or otherwise stuck on the conveyor belt 114. If so, the article may remain on the conveyor belt as the belt moves past the discharge end of the conveyor belt. An article remaining on the conveyor belt past the discharge end may continue to travel on the conveyor belt, underneath the conveyor. This may damage the conveyor belt and other components of the conveyor leading to time-intensive downtime and costly repairs.

Accordingly, a discharge safety switch is provided that shuts down the conveyor before an article is carried on the underside of the conveyor. In particular, a contact member of the discharge safety switch is positioned across the conveyor belt with a sufficiently minimal clearance to ensure that any article on the conveyor belt will collide with the contact member. When the article applies a force to the contact member that exceeds a configurable threshold, the contact member moves from a first position (illustrated in FIGS. 2A and 2B) to a second position (illustrated in FIG. 2C). A switch operably coupled to the contact member toggles the conveyor between an operating mode, when the contact member is in the first position, and a shutdown mode, when the contact member is in the second position. In the shutdown mode, the switch shuts down the conveyor belt and, in certain scenarios, one or more conveyors upstream of the discharge safety switch. Accordingly, the discharge safety switch prevents an article from traveling on an underside of the conveyor and electrically shuts down the conveyor.

Figure 2A:
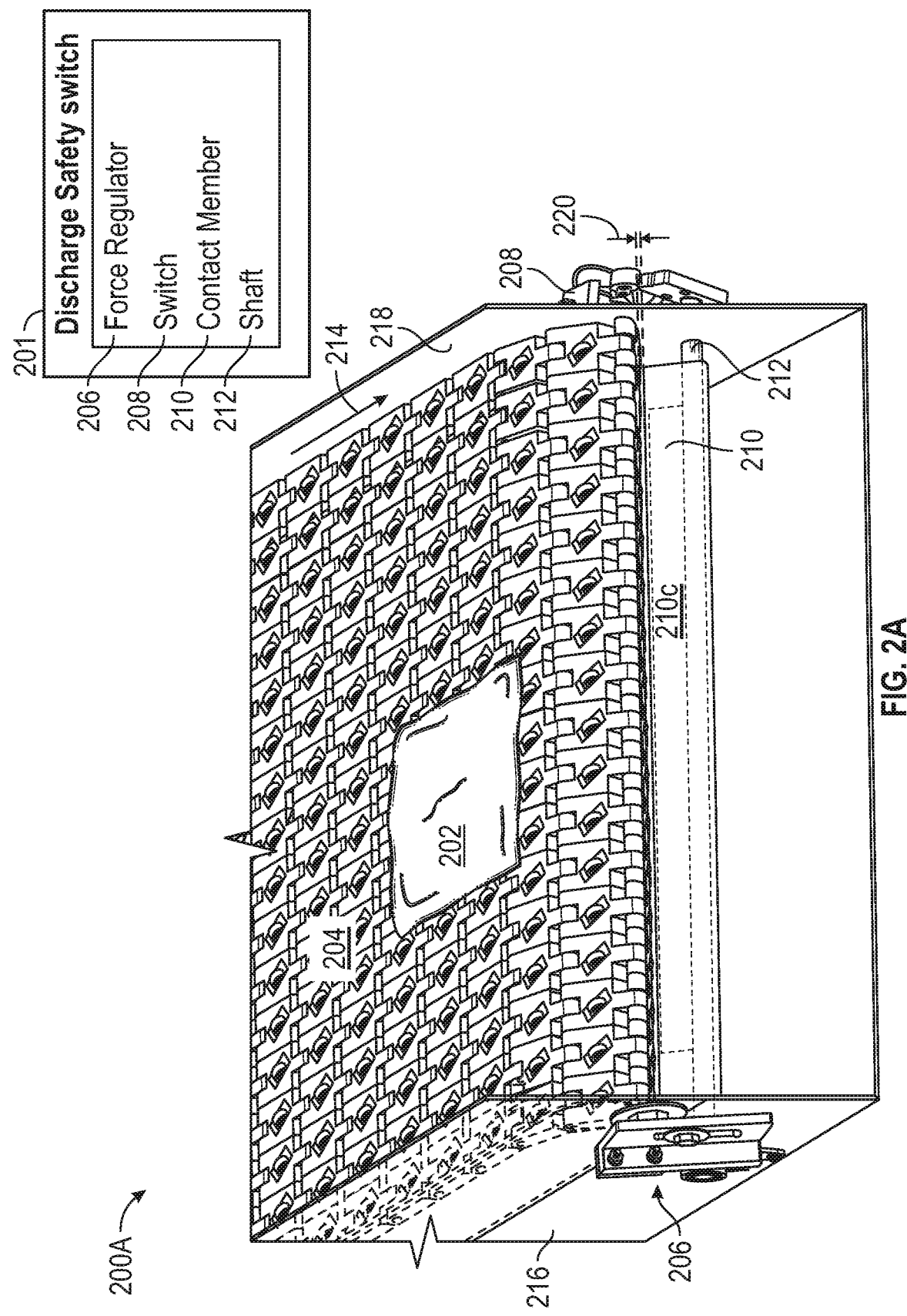
FIG. 2A illustrates an example discharge safety switch in first position when the conveyor belt is in an operating mode, according to one embodiment described herein.

FIG. 2A illustrates one embodiment of a conveyor 200A having a discharge safety switch 201 in the first position, corresponding to the operating mode. The conveyor 200A includes a belt 204 which may include one or more components of the conveyor belt 114 illustrated in FIG. 1B.

As shown in FIG. 2A, the discharge safety switch 201 is located proximate a discharge end of the conveyor 200A. The discharge safety switch 201 includes a contact member 210 coupled to a shaft 212. The shaft 212 is positioned between support walls 216, 218 of the conveyor 200A. Specifically, one end of the shaft 212 is rotatably disposed through a first support wall 216, and the other end of the shaft 212 is rotatably disposed through a second support wall 218. The contact member 210 is disposed on the shaft 212. The contact member 210 extends substantially across the width of the conveyor belt 204 in a direction substantially orthogonal to the direction of travel 214 of the belt 204. The contact member 210 defines an article-contact surface 210c facing into the direction of travel 214.

In the first position, the contact member 210 forms a first clearance gap 220 with the conveyor belt 204. The dimension of the first clearance gap 220 is selected to prevent articles disposed on the conveyor belt 204 (such as the article 202) from passing through the gap 220 in the event the article becomes inadvertently affixed to the conveyor belt 204. In one embodiment, the first clearance gap is less than or equal to one-fourth of an inch. According to an embodiment, the first clearance gap is three-sixteenths of an inch.

The discharge safety switch 201 also includes a force regulator 206 and a switch 208 (e.g., electrical switch). The force regulator 206 and switch 208 are coupled to the conveyor belt 204. As shown in FIG. 2A, in one embodiment, the force regulator 206 is coupled to the first end of the shaft 212, while the switch 208 is coupled to the other end of the shaft 212. The force regulator 206 is configured to set a minimum threshold force necessary to move the contact member 210 from the first position, as shown at 200A, to the second position, as shown at 200C in FIG. 2C.

Figure 2B:
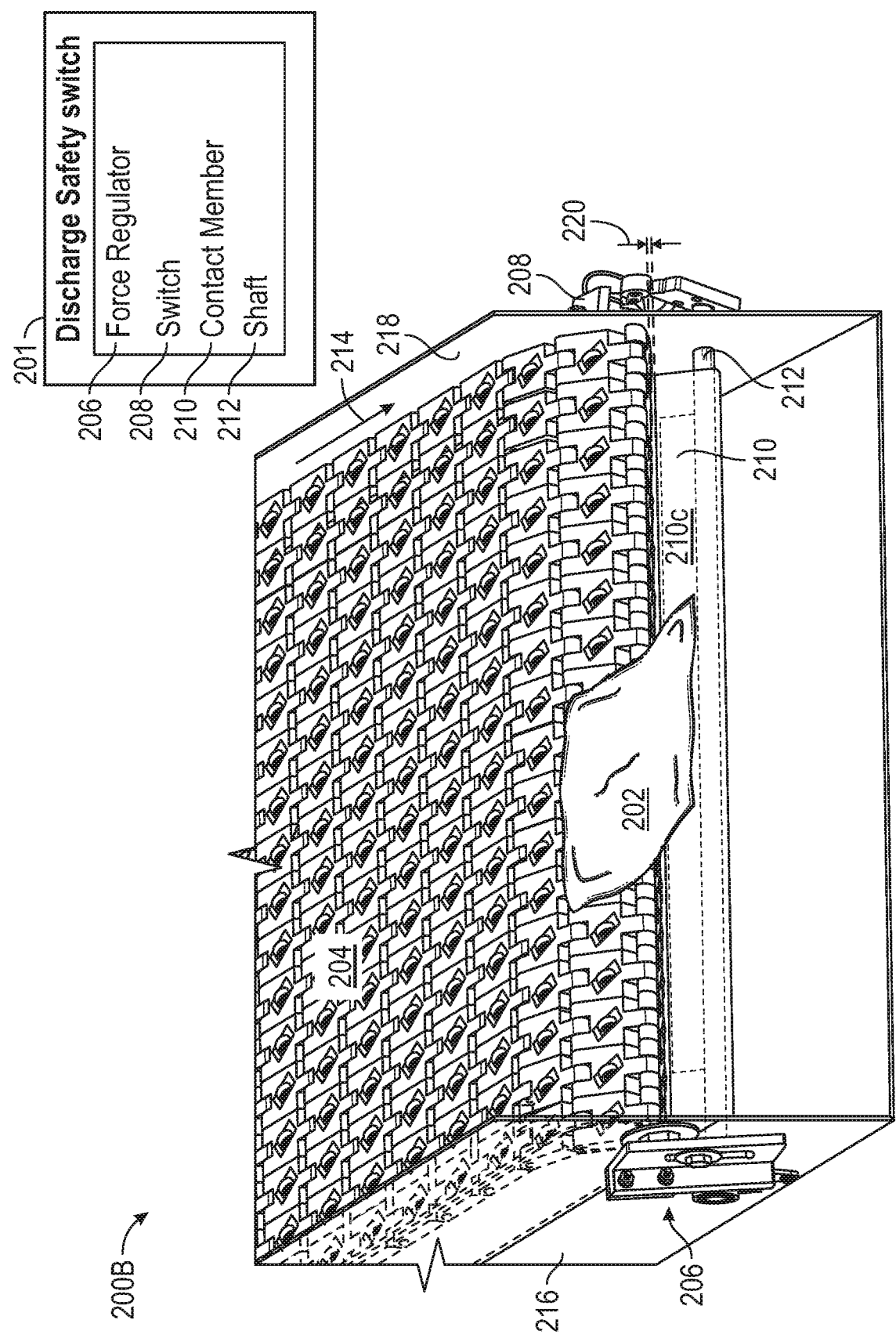
FIG. 2B illustrates a discharge safety switch oriented in a first position when an article contacts a contact member of the discharge safety switch, according to one embodiment described herein.

Once the conveyor 200B is actuated, the article 202 upstream of the discharge safety switch 201 moves in the direction 214 of conveyor belt 204 travel toward the discharge safety switch 201 and, if the article 202 has become inadvertently affixed to the conveyor belt 204, eventually engages the article-contact surface 210c as illustrated in FIG. 2B.

FIG. 2C illustrates the discharge safety switch oriented in a second position, according to one embodiment described herein. The article 202 contacts the article-contact surface 210c of the contact member 210 with a force greater than or equal to a threshold force necessary to move the contact member 210 from the first position, as illustrated in FIG. 2A, to the second position, as illustrated in FIG. 2C. The contact member 210 rotates along the longitudinal axis of the shaft 212 to move from the first position having the first clearance gap 220 between the contact member 210 and the conveyor belt 204, to the second position having a second clearance gap 222 between the contact member 210 and the conveyor belt 214. The second clearance gap 222 is greater than the first clearance gap 220. In the second position, the article-contact surface 210c of the contact member 210 is oriented in a parallel facing relationship with the conveyor belt 204. Rotation of the contact member 210 along the longitudinal axis of the shaft 212 engages the switch 208 to electrically shut down the conveyor 200C, which stops the conveyor belt 204 from moving when the contact member is in the second position.

Figure 3:
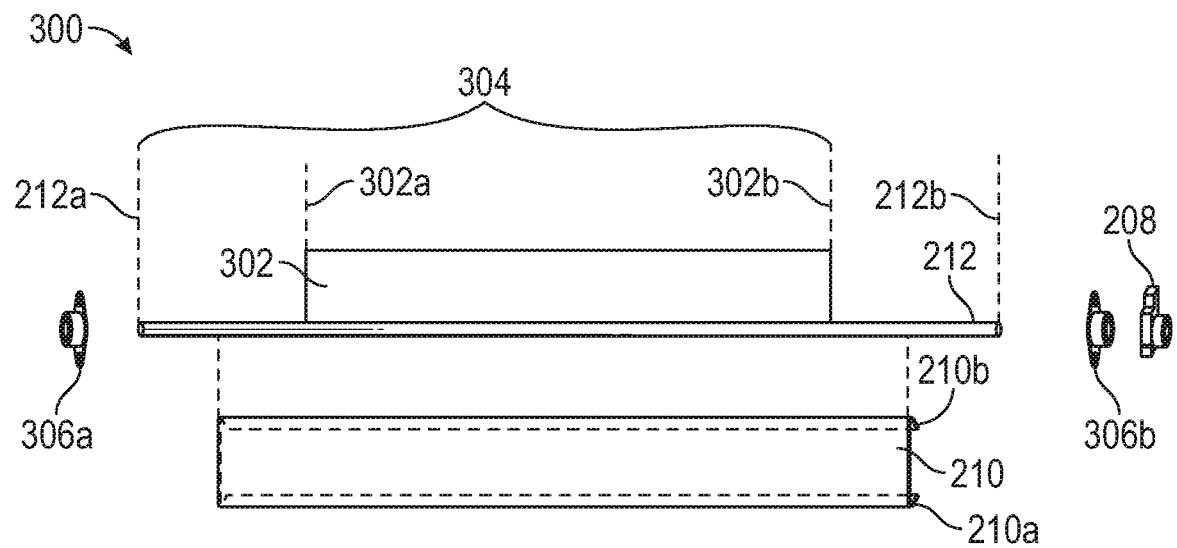
FIG. 3 illustrates a shaft, reinforcement member, and contact member of a discharge safety switch, according to one embodiment described herein.

FIG. 3 illustrates the shaft 212, reinforcement member 302, contact member 210, and switch 208 of a discharge safety switch, according to one embodiment described herein. In an embodiment, the shaft 212 is six feet long having a diameter of one-half of an inch. In an embodiment, one or more of the reinforcement member 302 and the contact member 210 are substantially rectangular pieces of sheet metal, such as 14 gauge sheet metal. According to an embodiment, the reinforcement member 302 provides support for the contact member 210.

As shown at 300, a reinforcement member 302 is coupled to the shaft 212. According to an embodiment, the reinforcement member 302 is welded on or otherwise coupled to the shaft 212 in a position such that a first end of the shaft 212a may be positioned in a first support wall of the conveyor and a second end of the shaft 212b may be positioned in a second support wall of the conveyor after the reinforcement member 302 is coupled to the shaft 212.

In one embodiment, the reinforcement member 302 is a substantially planar member having a first end 302a and a second end 302b. To facilitate placement of the shaft 212 coupled to the reinforcement member 302 between support walls of the conveyor, the distance 304 from a first end of the shaft 212a to the second end of the reinforcement member 302b is less than the width of the conveyor belt. As shown in 300, in one embodiment, the distance 304 is substantially equal to the width of the conveyor belt. The shaft 212, coupled to the reinforcement member 302, may be disposed into an opening of a first support wall. For example, the first end of the shaft 212a may be positioned into an opening of the first support wall. The shaft 212 may be slid into the opening such that the first end of the reinforcement member 302a is proximate to or contacts the first support wall. Thereafter, the second end of the shaft 212b may be positioned into an opening in the second support wall. With both ends of the shaft 212a and 212b positioned in a respective support wall of the conveyor, the shaft 212 may be centered between the support walls. A pair of brackets 306a, 306b hold the shaft 212 in place at a fixed distance from the conveyor belt while allowing the shaft 212 to rotate along its longitudinal axis.

Once the shaft 212 is rotatably disposed in the support walls of the conveyor, the contact member 210 is positioned over the reinforcement member 302. A first end of the contact member 210a may be folded over and secured to the shaft 212 and a second end of the contact member 210b may be folded over the reinforcement member 302. The width of the contact member 210 is substantially equal to the width of the conveyor belt. The contact member 210, positioned on the shaft 212 and reinforcement member 302, ensures that the discharge safety switch extends substantially across a width of the conveyor belt. Therefore, all articles traveling on the conveyor belt will contact the contact member 210 of the discharge safety switch.

A switch 208 is operatively coupled to the shaft 212 and may be configured to toggle the conveyor between the operating mode and the shutdown mode. More specifically, the shaft 212 is rotatable about its longitudinal axis, thereby allowing the contact member 210 to move between a first position, when the conveyor is in the operating mode, and a second position, when the conveyor is in the shutdown mode. When the contact member 210 moves to the second position, the shaft 212 rotates and trips the switch 208, causing the conveyor to shut down. In one embodiment, the switch 208 further shuts down one or more conveyors upstream of the discharge safety switch.

Figure 4:
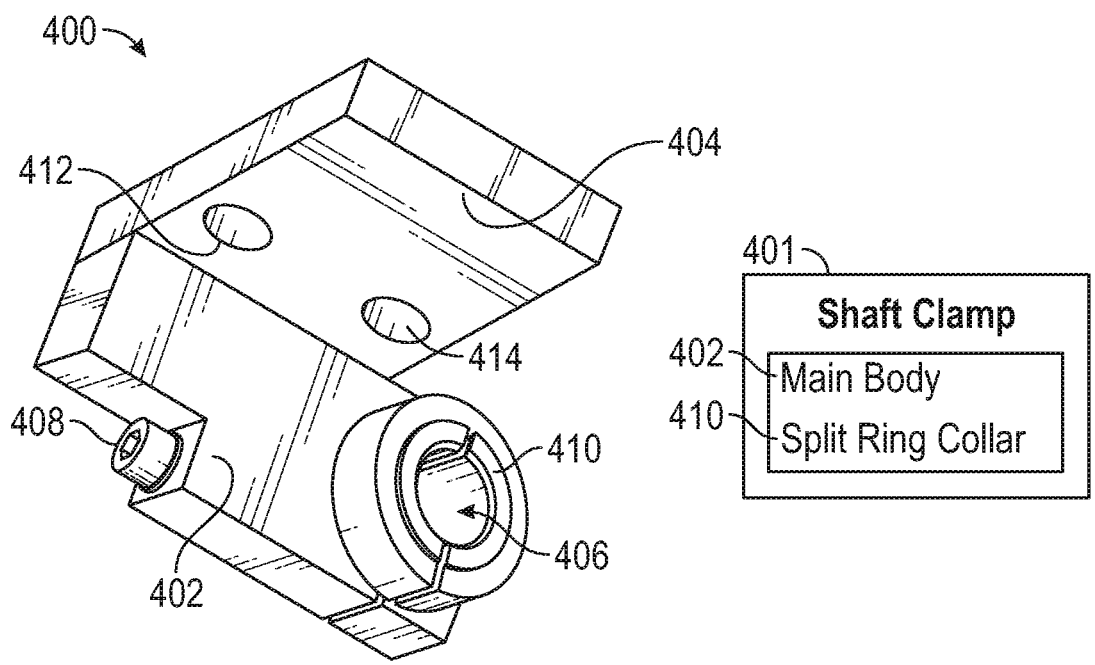
FIG. 4 illustrates a mounting bracket for a force regulator, according to one embodiment described herein.

FIG. 4 illustrates one embodiment of a mounting bracket 400 for the force regulator 206. Illustratively, the mounting bracket 400 comprises a shaft clamp 401 configured to grip the shaft 212 when the shaft is rotatably disposed between first and second support walls 216, 218 of the conveyor, according to one embodiment described herein.

The shaft clamp 401 includes a main body 402 and a split ring collar 410 affixed to (e.g. by welding) the main body 402. The opening 406 of the collar is registered with an opening (not shown) of the main body 402. The diameter of the opening 406 is adjustable by tightening or loosening a bolt 408 disposed in the main body. During assembly, the bolt 408 is backed out to open the diameter of the opening in the main body 402 and the opening 406 of the collar 410 to a size sufficient to receive the shaft 212. The bolt 408 is then tightened causing the main body 402 and the collar 410 to clamp down on the shaft 212. The bolt 408 may be tightened to the degree necessary to prevent slippage between the collar 410 and the shaft 212. A cantilevered mounting plate 404 is attached to the main body 402 such that the mounting plate 404 extends perpendicularly relative to the support wall 216. The mounting plate 404 provides a support surface for the force regulator 206, which can be releasably coupled to the mounting plate 404 by, e.g., screws or bolts. Accordingly, in the illustrated embodiment the mounting plate 404 is provisioned with two bolt holes 412, 414. As will be described with reference to FIGS. 5A and 5B, because the shaft clamp 401 is coupled to the shaft 212, the shaft clamp rotates 401 with the shaft 212 when the contact member 210 moves from the first position to the second position.

According to an embodiment, the shaft clamp is welded to the shaft instead of being secured to the shaft 212 via the split ring collar 410 using the bolt 408. Similar to the embodiment described in FIG. 4, the shaft clamp welded to the shaft 212 rotates when the contact member 210 moves from the first position to the second position.

Figure 5A:
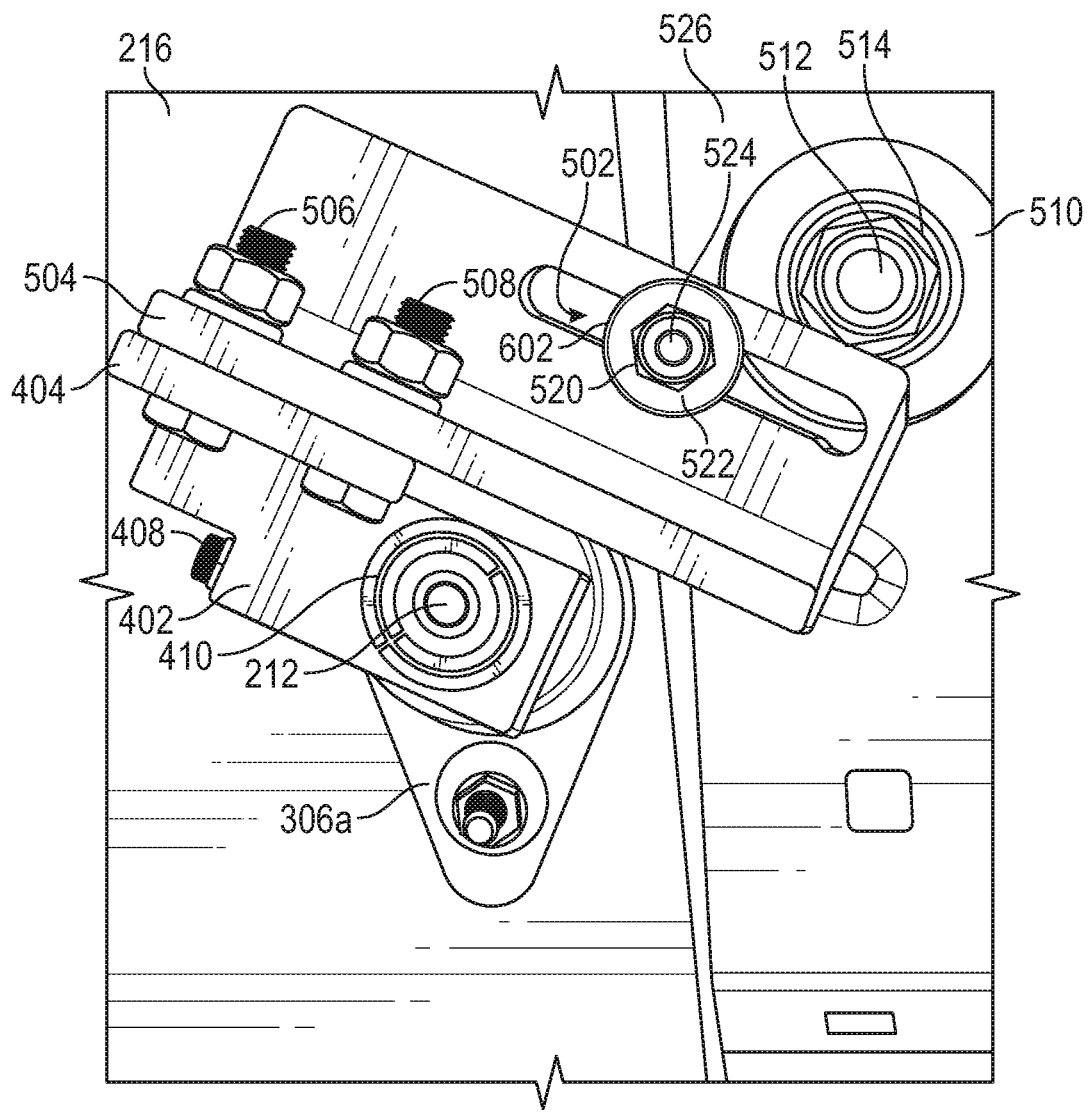
FIG. 5A illustrates a shaft clamp coupled to a force regulator when the contact member is oriented in a first position, according to one embodiment described herein.

FIG. 5A illustrates one embodiment of the force regulator 206 mounted to the mounting bracket 400. In particular, the force regulator 206 is secured to the mounting plate 404 with bolts 506, 508 disposed through the two bolt holes 412, 414 of the mounting plate 404 and corresponding bolt holes in a main body of the force regulator 206 (shown here as an angle bracket 504). The angle bracket 504 has two facets. A first facet is provisioned with the bolt holes for receiving the bolts 506, 508. The second facet is provisioned with a slot 502. The slot 502 accommodates a first roller of a first assembly which can be positioned at any point along the length of the slot. The first roller assembly will now be described with brief reference to FIG. 6.

Figure 6:
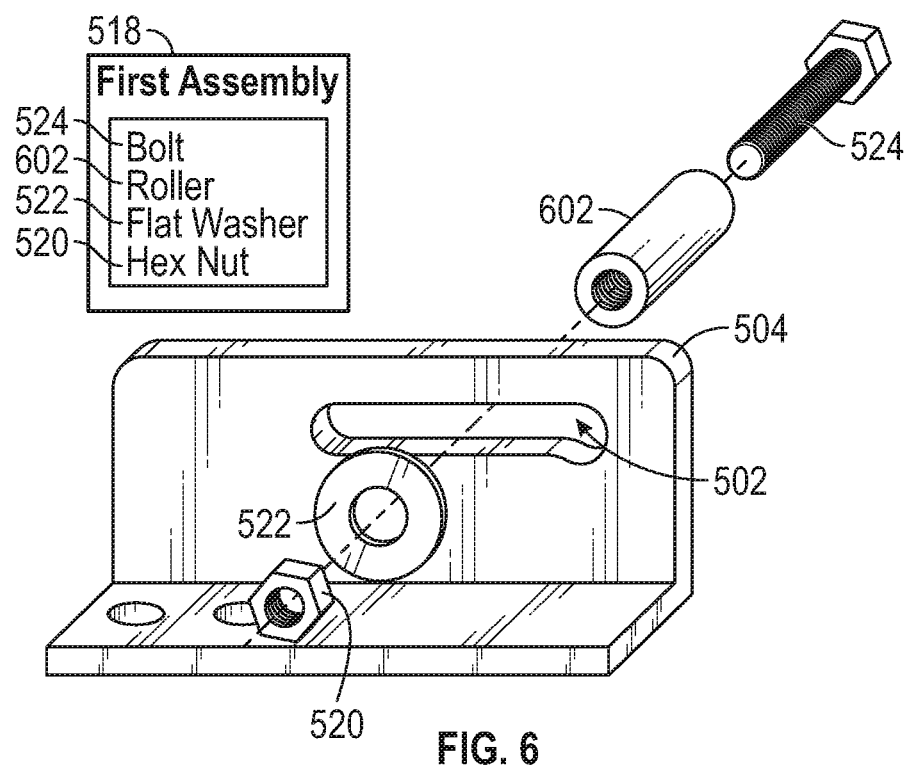
FIG. 6 illustrates a roller assembly that may be used in a force regulator of the discharge safety switch, according to one embodiment described herein.

FIG. 6 illustrates the first roller 602 disposed within the slot 502 of the angle bracket 504, according to one embodiment described herein. The roller 602 has a diameter y that is substantially equal to, or slightly less than, the width of the slot 502, thereby allowing the roller 602 to travel along the length of the slot 502. The roller 602 can be secured at a desired position within the slot 502 with a bolt assembly. The bolt assembly includes a bolt 524 (disposed through the roller 602), a flat washer 522, and a hexnut 520 that collectively couple the first roller 602 of the first assembly 518 to the angled bracket 504

Returning to FIG. 5A, a second roller 510 is coupled to a wall 526 of the conveyor using a bolt assembly including a bolt 512 and a nut 514. The second roller 510, bolt 512, and nut 514 are referred to herein as a second assembly 516. In operation, the rotation of the shaft (caused by a force on the contact member) causes the first assembly 518 to move toward the second assembly 516. The first roller 602 is positioned in the slot 502 to ensure that the first roller 602 contacts the second roller 510. During continued rotation, and while the rollers 602, 510 are engaged at their respective outer diameters, the first roller 602 rolls over the second roller 510. In one embodiment, one or both of the rollers are made of an elastomeric material to allow for some deformation of the respective roller(s). If the force on the contact member 210 is sufficient to overcome the resistance created by the contacting rollers then the rollers will eventually disengage at which point the force regulator will be in the second position (i.e., the shut-off position), as shown in FIG. 5B.

In one embodiment, the threshold force on the contact member 210 necessary to move the force regulator from the first position to the second position can be adjusted by adjusting the resistance created by engaging the first assembly 518 with the second assembly 516 during rotation of the shaft. For example, the threshold force can be adjusted by tightening the bolt 512 of the second assembly 516 and/or the bolt 524 of the first assembly 518. The higher the torque applied to the bolt assemblies, the greater the rotational resistance offered by the respective assembly and, hence, the greater the threshold force necessary to move the contact member.

Figure 5B:
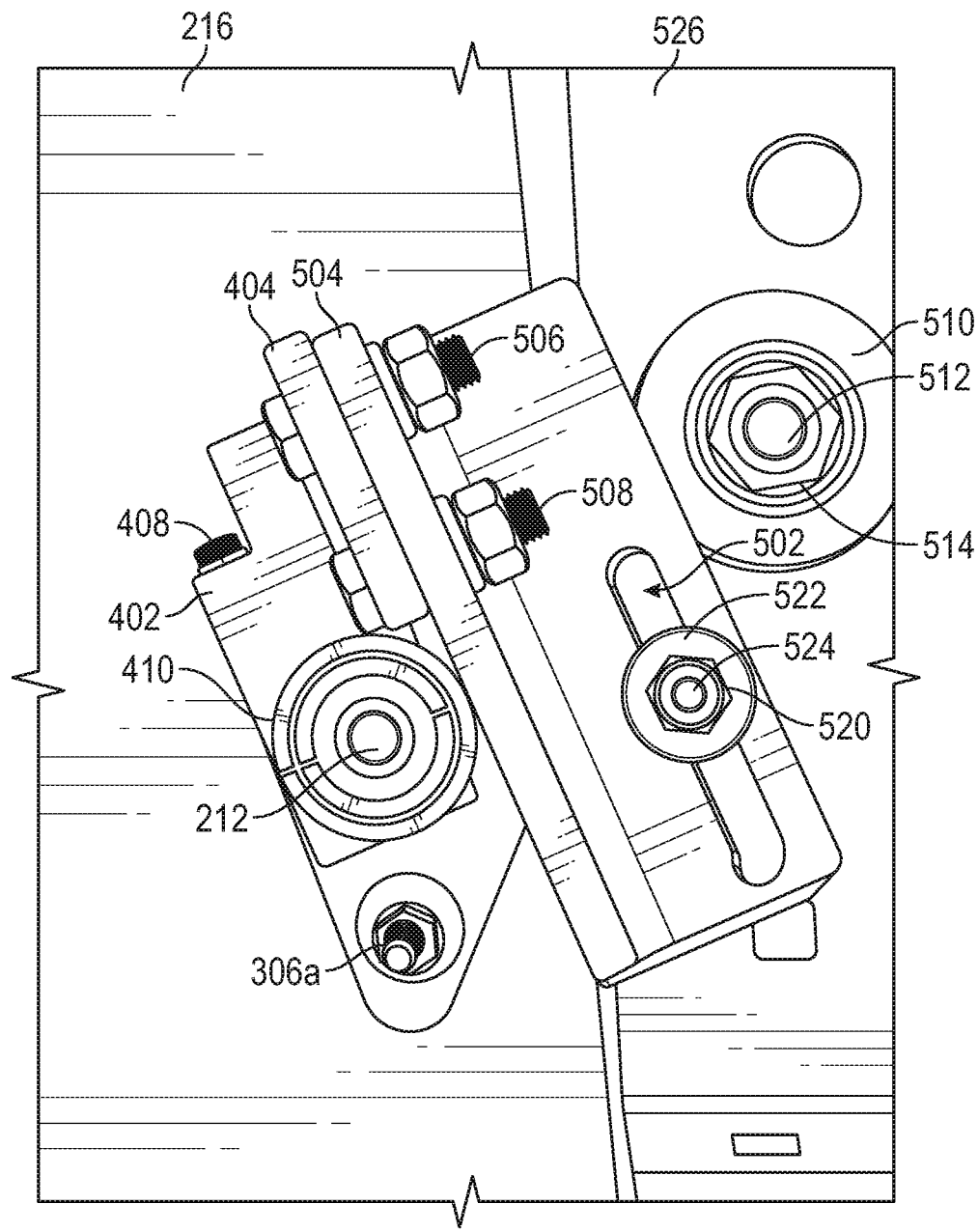
FIG. 5B illustrates a shaft clamp coupled to a force regulator when the contact member is oriented in a second position, according to one embodiment described herein.

While the force regulator 206 illustrated in FIGS. 5A and 5B includes two adjustable, rotatable assemblies 516, 518, one adjustable, rotatable assembly is sufficient to set the configurable threshold force necessary for moving the contact member 210 from the first position to the second position. Therefore, in an embodiment, the first assembly 518 is adjustable and rotatable and the second assembly 516 is affixed to the wall 526 and is not adjustable.

Figure 7:
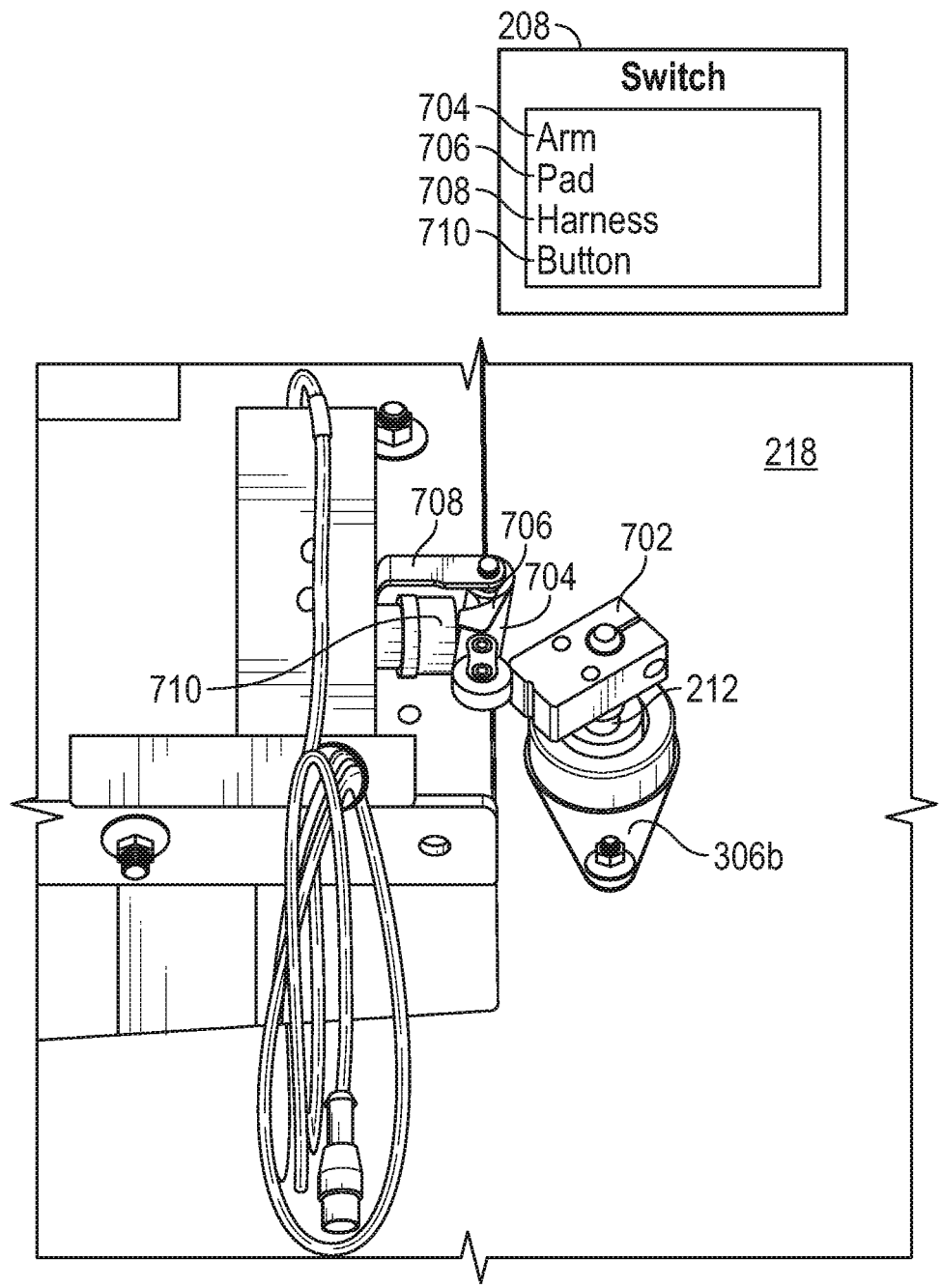
FIG. 7 illustrates an electrical shutdown switch of the discharge safety switch, according to one embodiment described herein.

FIG. 7 illustrates the switch 208 configured to toggle the conveyor between the operating mode and the shutdown mode, according to one embodiment described herein. The bracket 306b couples the shaft 212 to the support wall 218 of the conveyor. A cam 702 is coupled to an end of the shaft 212. The switch 208 includes an arm 704, a pad 706 coupled to the arm 704, a harness 708 attached to the arm 804 and the pad 706, and a button 710. The button 710, when depressed, is configured to electrically shut down the conveyor.

In operation, rotation of the shaft along its longitudinal axis when the contact member 210 moves from the first position to the second position causes the cam 702 to rotate. Rotation of the cam 702 engages the arm 704. Engagement of the arm 704 causes the pad 706 to depress a button 710, thereby causing the conveyor to enter the shutdown mode. In an embodiment, depressing the button 710 also electrically shuts down one or more conveyors upstream of the discharge safety switch.

Figure 8:
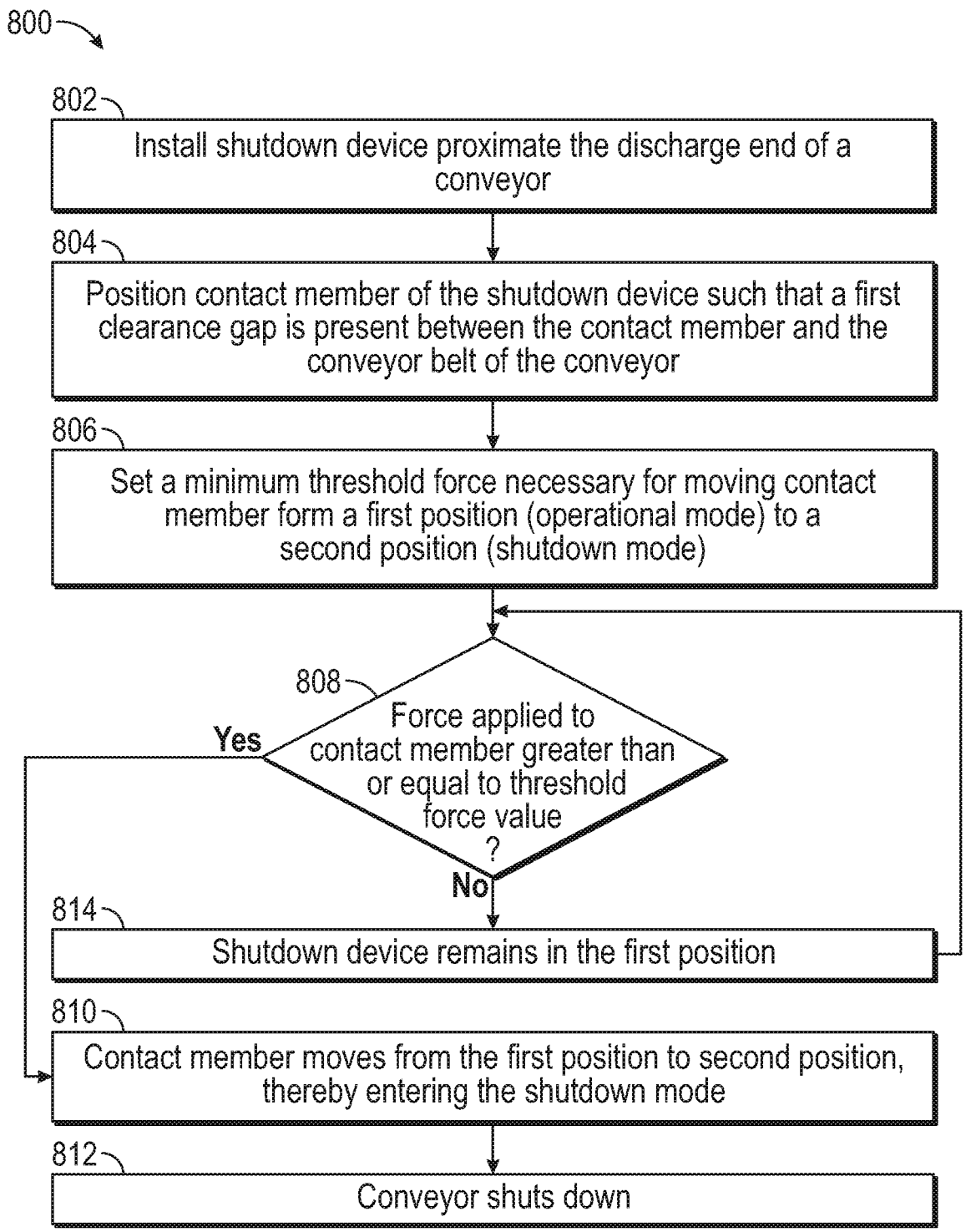
FIG. 8 is a flow diagram illustrating a method for operation of a discharge safety switch, according to one embodiment described herein.

FIG. 8 is a flow diagram illustrating a method 800 for operating a discharge safety switch, according to one embodiment described herein. At 802, a shutdown device, including a shaft, contact member, force regulator, and switch, is installed proximate the discharge end of a conveyor. According to one embodiment, the shaft and reinforcement member are positioned between support walls of the conveyor. Thereafter, the contact member is positioned on top of the reinforcement member.

At 804, the contact member is positioned such that a first clearance gap is present between the contact member and the conveyor belt. The first clearance gap is selected to prevent articles affixed to the conveyor belt from passing thru the gap.

At 806, the force regulator is adjusted to set a minimum threshold force necessary to move the contact member from the first portion to the second position After 806, the conveyor is actuated and articles move in the direction of conveyor belt travel. At 808, a force is applied by an article on the conveyor belt to the contact member. At 810, if the force applied by the article on the contact member is greater than or equal to the minimum threshold force necessary to move the contact member, the contact member moves from the first position to the second position and, at 812, the conveyor enters the shutdown mode. Entering the shutdown mode when an article urges the contact member with sufficient force prevents the conveyor belt from operating when an article remains on the conveyor belt past a discharge point. The conveyor may be reset after the obstruction is cleared and the shutdown device is properly installed.

At 814, if the force applied by the article is less than the minimum threshold force necessary for moving the contact member, the contact member remains in the first position and the conveyor remains in an operating mode. This may happen, for example, when the article becomes dislodged from the belt before it can urge the contact member into the second position.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof, and the scope thereof is determined by the claims that follow.

What is claimed is:

1. A method, comprising:
actuating a conveyor comprising a plurality of rollers and a conveyor belt disposed on the plurality of rollers, the conveyor including a shutdown device located proximate a discharge end of the conveyor, wherein the shutdown device comprises:
a contact member disposed transverse to a direction of travel of the conveyor belt, and in a spaced relationship with the conveyor belt proximate the discharge end of the conveyor, the contact member positionable between a first position in which the conveyor is configured to operate and a second position in which the conveyor is configured to shut down;

a force regulator located on a first side of the conveyor belt; and a shutdown switch operably connected to the conveyor;

causing an article placed on the conveyor belt to travel along the direction of travel toward the discharge end of the conveyor;

moving the contact member from the first position to the second position as a result of the article on the conveyor belt being urged against the contact member at the discharge end of the conveyor with a force sufficient to overcome a minimum threshold force setting of the force regulator; and tripping the shutdown switch as a result of the contact member moving from the first position to the second position, wherein tripping the shutdown switch causes the conveyor to shut down before the article is carried on an underside of the conveyor.

2. An apparatus, comprising:

a conveyor comprising a plurality of rollers and a conveyor belt disposed on the plurality of rollers; and a shutdown device disposed at a discharge end of the conveyor, the shutdown device comprising:

a contact member disposed in a spaced relationship with the conveyor belt proximate the discharge end of the conveyor, wherein the contact member extends substantially across a width of the conveyor belt, wherein the contact member is positionable between a first position and a second position, the first position forming a first clearance gap between the contact member and the conveyor belt and the second position forming a second clearance gap between the contact member and the conveyor belt, wherein the second clearance gap is greater than the first clearance gap; and a switch operably connected to the contact member, wherein the contact member causes the switch to toggle the conveyor between an operating mode when the contact member is in the first position and a shutdown mode when the contact member is in the second position.

3. The apparatus of claim 2, wherein:

the shutdown device comprises a shaft;

the contact member is coupled to the shaft; and the shaft is rotatable about its longitudinal axis, thereby allowing the contact member to move between the first position and the second position.

4. The apparatus of claim 3, wherein respective ends of the shaft are rotatably disposed in a first support wall and a second support wall of the conveyor proximate the discharge end.

5. The apparatus of claim 4, wherein the shutdown device comprises:

a reinforcement member coupled to the shaft in a position such that the shaft is rotatably disposed in the first support wall and the second support wall after the reinforcement member is coupled to the shaft, wherein the contact member is removably positioned over the reinforcement member such that the reinforcement member supports the contact member.

6. The apparatus of claim 2, wherein the contact member moves from the first position to the second position when a force greater than or equal to a configurable minimum threshold force is applied to the contact member.

7. The apparatus of claim 2, wherein the first clearance gap between the contact member and the conveyor belt is less than or equal to one fourth of an inch.

8. The apparatus of claim 2, wherein the contact member includes an article-contact surface oriented to face into a direction of travel on an outer surface of the conveyor belt when the contact member is in the first position, and wherein the article-contact surface is oriented in a parallel facing relationship with the outer surface of the conveyor belt when the contact member is in the second position.

9. The apparatus of claim 2, wherein the shutdown device comprises:

a force regulator coupled to the contact member, and configured to set a minimum threshold force applied to the contact member for moving the contact member from the first position to the second position.

10. The apparatus of claim 9, wherein the force regulator includes a roller assembly, wherein a coupling of the roller assembly to the contact member is adjustable to set the minimum threshold force.

11. The apparatus of claim 10, wherein the roller assembly comprises:

a first roller coupled to a wall of the conveyor;

a first bolt and a first nut coupling the first roller to the wall of the conveyor;

a second roller coupled to the contact member; and a second bolt and a second nut coupling the second roller to the contact member, wherein:

the minimum threshold force is adjusted based, at least in part, on a tightening torque applied to at least one of the first or second bolts, the first roller is in contact with the second roller when the contact member is in the first position, and a force greater than or equal to the minimum threshold force applied to the contact member causes the second roller to roll past the first roller such that the first roller is not in contact with the second roller when the contact member is in the second position.

12. The apparatus of claim 9, wherein the force regulator is coupled to a first end of the contact member and the switch is coupled to a second end of the contact member.

13. The apparatus of claim 2, wherein in the shutdown mode, the shutdown device is configured to shut down one or more conveyors upstream of the shutdown device.

14. A shutdown device, comprising:

a contact member disposed in a spaced relationship with a discharge end of a conveyor comprising a conveyor belt, wherein the contact member is configured to extend substantially across a width of the conveyor belt, wherein the contact member is configured to be positionable between a first position and a second position, the first position forming a first clearance gap between the contact member and the conveyor belt and the second position forming a second clearance gap between the contact member and the conveyor belt, wherein the second clearance gap is greater than the first clearance gap;

a force regulator coupled to the contact member and configured to set a minimum threshold force for moving the contact member from the first position to the second position; and a switch operably connected to the contact member, wherein the contact member causes the switch to toggle the conveyor between an operating mode when the contact member is in the first position and a shutdown mode when the contact member is in the second position, wherein in the shutdown mode the shutdown device is configured to shut down one or more conveyors upstream of the shutdown device.

15. The shutdown device of claim 14, further comprising:
a shaft, wherein the contact member is coupled to the shaft, and wherein the shaft is rotatable about its longitudinal axis, thereby allowing the contact member to move between the first position and the second position.

16. The shutdown device of claim 15, wherein the contact member rotates from the first position to the second position when a force greater than or equal to a configurable minimum threshold force is applied to the contact member.

17. The shutdown device of claim 15, wherein respective ends of the shaft are rotatably disposed in a first support wall and a second support wall of the conveyor proximate the discharge end.

18. The shutdown device of claim 17, further comprising:
a reinforcement member coupled to the shaft in a position such that the shaft is rotatably disposed in the first support wall and the second support wall after the reinforcement member is coupled to the shaft, wherein the contact member is removably positioned over the reinforcement member such that the reinforcement member supports the contact member.

19. The shutdown device of claim 14, wherein, in the first position, the first clearance gap between the contact member and the conveyor belt is less than or equal to one fourth of an inch.

20. The shutdown device of claim 14, wherein the contact member includes an article-contact surface oriented to face into a direction of travel on an outer surface of the conveyor belt when the contact member is in the first position, and wherein the article-contact surface is oriented in a parallel facing relationship with the outer surface of the conveyor belt when the contact member is in the second position.

* * * * *